United States Patent [19]

Sinklier et al.

[11] 4,191,501
[45] Mar. 4, 1980

[54] PLASTIC LENS CUTTER AND EDGER

[75] Inventors: Robert W. Sinklier, Ventura; Virgil A. Venditto, Jr., Oxnard, both of Calif.

[73] Assignee: National Optronics, Incorporated, Charlottesville, Va.

[21] Appl. No.: 926,747

[22] Filed: Jul. 21, 1978

[51] Int. Cl.² .............................................. B23C 1/18
[52] U.S. Cl. .................................................... 409/104
[58] Field of Search ...................... 90/13.4, 13.3, 13.6, 90/13.7, 13 B; 51/101 LG

[56] References Cited

U.S. PATENT DOCUMENTS

| 2,333,064 | 10/1943 | Williams et al. | 90/13.4 |
| 3,828,648 | 8/1974 | Geula | 90/13.3 |

*Primary Examiner*—Gil Weidenfeld
*Attorney, Agent, or Firm*—Ralph B. Pastoriza

[57] ABSTRACT

The machine is designed for the specific purpose of cutting plastic lenses such as acrylic and polycarbonate types. The machine itself includes a table carrying a lens cutter and lens pattern engaging cam in coaxial alignment. A head carrying a plastic lens to be cut and lens pattern in coaxial alignment is coupled to the table for movement towards and away from the axis of the lens cutter and lens pattern engaging cam. The lens cutter engages the periphery of the lens to be cut. The lens pattern defines the finished contour of the lens and engages the cam after a slight radial cut is initially made into the periphery of the lens. Subsequent rotation of the lens and pattern simultaneously results in a cutting of the lens out of the lens material by the lens cutter as opposed to grinding away the periphery of the lens. The machine also incorporates controls for automatically effecting a beveling operation on the lens after the rough cut has been completed.

6 Claims, 4 Drawing Figures

U.S. Patent
Mar. 4, 1980
4,191,501
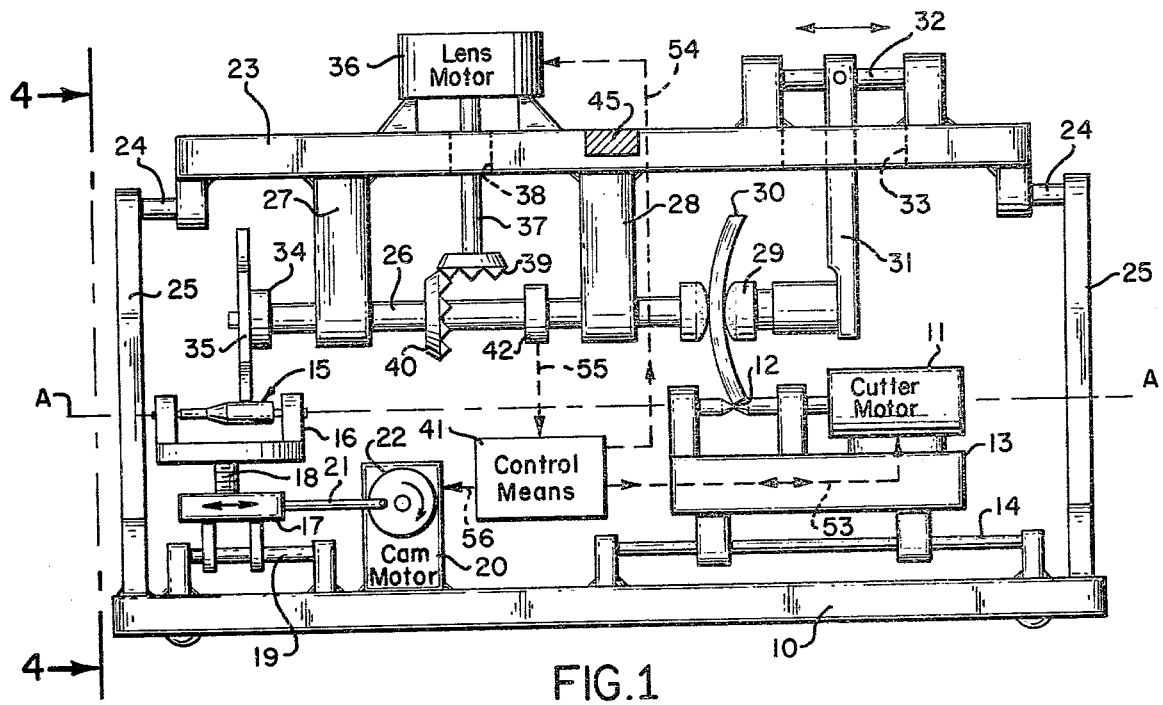
FIG.1
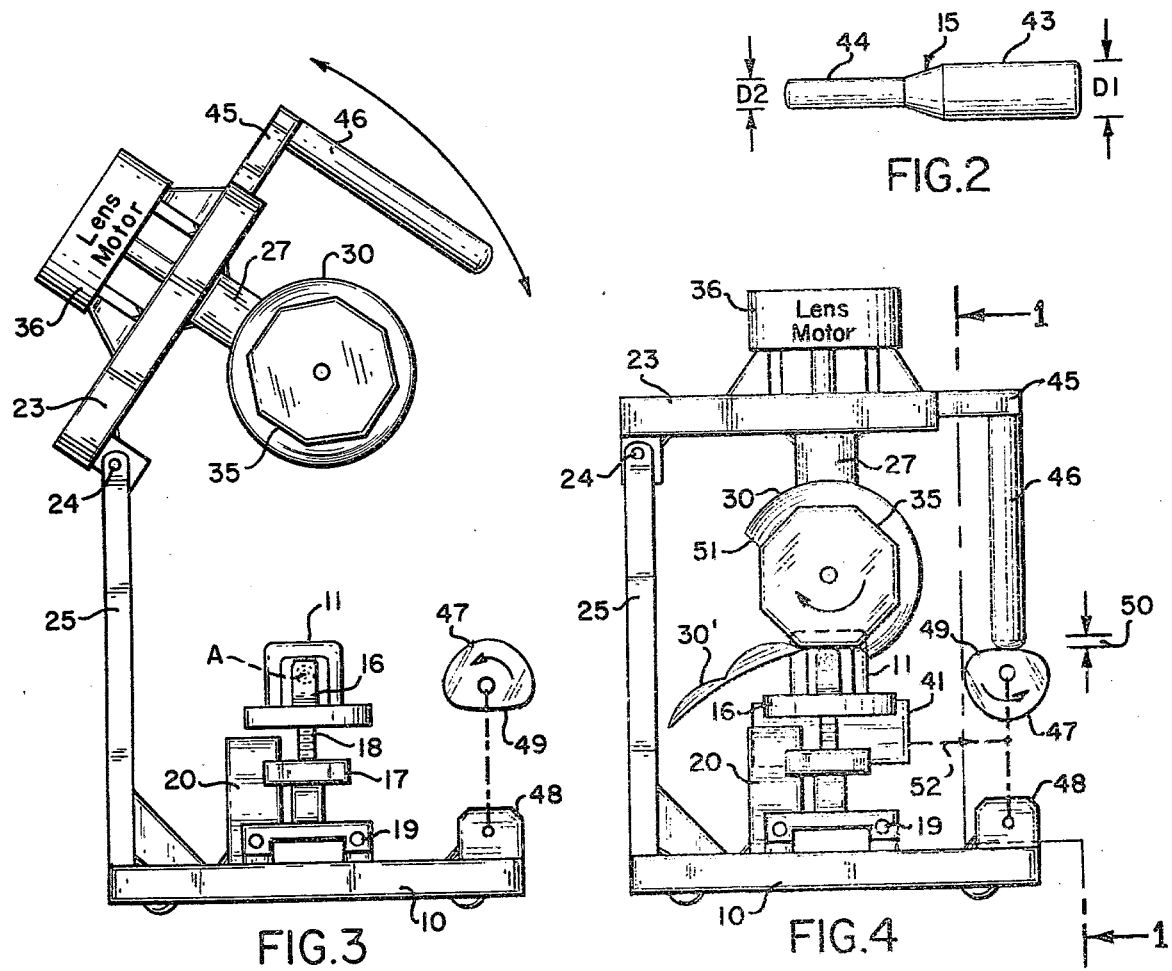
FIG.2
FIG.3
FIG.4

PLASTIC LENS CUTTER AND EDGER

BACKGROUND OF THE INVENTION

Each of the lens in most eyeglasses or spectacles worn by persons is of a non-circular contour primarily to avoid ambiguity in orientation of the eyeglass lens in the frames. Thus, such lens may have a somewhat assymetrical oval shape, octagonal shape and similar irregular shapes.

A necessary operation in the manufacture of glasses thus involves proper contouring of the lens. Normally, such contouring is carried out by automatic edging machines which grind away peripheral portions of a normally provided circular lens to conform to the desired contour. In this respect, a lens pattern is provided for controlling the grinding operation.

All such lens edgers made in the U.S., so far as applicants are aware, are made for cutting glass. Normally these edgers use diamond cutting wheels.

Recently, the use of plastic lenses for eyeglasses has become quite popular. Normally, there are presently available three groups of such plastic lenses identified as CR39, acrylic and polycarbonate. None of the foregoing mentioned prior art edgers will successfully cut or grind the new acrylic and polycarbonate type lenses. Accordingly, without automatic machinery for carrying out the edging operation, these particular materials when used require other means for contouring the same resulting in a substantial increase in expense.

SUMMARY OF THE INVENTION

Bearing the foregoing in mind, we have built a completely new and different cutter and/or edger machine for the specific purpose of cutting all plastic lenses, particularly those of the acrylic and polycarbonate type.

Briefly, in accord with our invention, the plastic lens cutter and edger includes a table carrying a lens cutter and lens pattern engaging cam in coaxial alignment. A head structure carrying a plastic lens to be cut and lens pattern in coaxial alignment is coupled to the table for movement towards and away from the axis of the lens cutter and lens pattern engaging cam. The arrangement is such that the lens cutter engages the periphery of the lens to be cut, the pattern defining the finished contour of the lens engaging the cam after a slight radial cut is made into the periphery of the lens so that subsequent rotation of the lens and pattern simultaneously results in a cutting of the lens out of the lens material by the lens cutter as opposed to grinding away the periphery of the lens.

The machine further includes as an important feature, means for moving the cam to change the level of the lens and enable the cutter to carry out a beveling and finishing operation on the lens after the rough cut has been completed.

As a consequence of the provision of the foregoing machine, plastic lens of the acrylic and polycarbonate type can be readily contoured in a completely automatic manner all to the end that a substantial savings in time and effort in the provision of plastic type eyeglasses is realized.

BRIEF DESCRIPTION OF THE DRAWINGS

A better understanding of this invention will be had by now referring to the accompanying drawings in which:

FIG. 1 is a side elevational view partly schematic in form of the basic machine making up our invention;

FIG. 2 is a side elevation of one of the components of the machine of FIG. 1;

FIG. 3 is an end view of the machine of FIG. 1 with a head portion partially raised preparatory to loading with a lens to be cut; and, FIG. 4 is an end view similar to FIG. 3 with the head portion of the machine in operating position for cutting a lens, FIG. 4 being taken generally in the direction of the arrows 4—4 of FIG. 1 and FIG. 1 being taken generally in the direction of the arrows 1—1 of FIG. 4.

DETAILED DESCRIPTION OF THE PREFERRED EMBODIMENT

Referring first to the lower right hand portion of FIG. 1, the machine includes a table 10 mounting a cutter motor 11 connected to drive cutting blades 12 at high speed.

The axis of rotation of the blades 12 is indicated by the dashed axis line A—A and in the orientation illustrated this axis is horizontal. Cutter motor 11 and cutting blades 12 are mounted on a carriage 13 for longitudinal or back and forth movement on a pair of guide rails, one of which is shown at 14 secured to the table 10. This back and forth "floating" action is indicated by the double-headed arrow in the carriage 13 and occurs only when the carriage is released.

Referring now to the left hand portion of FIG. 1, coaxial with the rotational axis of the cutter motor and cutting blades 12 is a lens pattern engaging cam 15 mounted for free rotation about the axis A—A in yoke 16. Yoke 16 is supported on a carriage 17 by way of an adjustable elevation screw 18. Carriage 17 is mounted on guide rails one of which is shown at 19 for limited back and forth movement between first and second positions as indicated by the double-headed arrow in the carriage 17. This motion may be effected by a cam motor 20 and a link 21 pivotally connected at opposite ends to the carriage 17 and an eccentric point on a wheel 22 connected to the cam motor. A 180° rotation of the wheel 22 in a clockwise direction from the first position shown in FIG. 1 moves the carriage 17 to the right to a second position. The purpose for this structure will become evident as the description proceeds.

Referring now to the upper left portion of FIG. 1, there is shown a head 23 pivotally mounted to the rear portion of the table as by pivots 24 and upstanding arms 25. The pivots and arms may be disposed inwardly of the left and right ends of the table 23 but are shown to the extreme left and right so that they will be visible for illustrative purposes. The arrangement is such that the head 23 can move towards and away from the lens cutter axis A—A.

Supported to the underside of the table 23 is a shaft 26 journalled in supports 27 and 28, this shaft being parallel to the axis A—A of the lens cutter 12 and the lens pattern engaging cam 15. The right end portion of the shaft 26 includes a lens holder chuck 29 for holding a plastic lens 30 to be cut. Chuck 29 is mounted on arm 31 arranged to move along a guide rod 32 mounted on the head 23 as shown. The head 23 includes a longitudinal slot 33 to accommodate movement of the arm 31 so that the plastic lens 30 can be received in the chuck 29 and the same clamped in position.

The other or left end of the shaft 26 includes a lens pattern holder 34 for supporting a lens pattern 35 in coaxial alignment with the lens 30. In the position of the parts illustrated in FIG. 1, the lens pattern 35 is shown in engagement with the lens pattern engaging cam 15.

Shaft 26 is arranged to be rotated in a controlled manner by means of a lens motor 36 mounted on the head 23. Towards this end, there is provided a lens motor shaft 37 passing through an appropriate opening 38 in the head 23 terminating in bevel gears 39 and 40 for coupling to the shaft 26.

Finally, there is illustrated in the central portion of FIG. 1 a control means depicted by the block 41 for automatically controlling the lens cutting and edging operation. Part of the controls in this control means are responsive to the rotational position of the shaft 26 as indicated by a switch cam 42 secured to the shaft 26 and connecting to the control means.

Referring now to FIG. 2, there is shown in greater detail the lens pattern engaging cam 15 described in the left hand portion of FIG. 1. As mentioned, this cam is arranged to be moved between first and second positions. In the first position illustrated in FIG. 1, a larger diameter portion 43 of the cam engages the lens pattern 35. In the second position a reduced diameter portion 44 engages the lens pattern 35, the shifting action effectively lowering the lens pattern 35 and associated shaft 26, lens 30 and entire head structure 23. The first and second diameters of the cam 15 are indicated in FIG. 2 at D1 and D2.

Referring now to the end view of FIG. 3, the head 23 is shown partially raised preparatory to loading the same with a lens 30 and lens pattern 35. The pivoting action of the head 23 about the pivot rod 24 is illustrated by the double-headed arrow and when actually loading the head, it will be swung back to a vertical position.

FIG. 3 further illustrates one additional control which has not been illustrated in FIG. 1 to avoid obscuring other portions of the machine. More particularly, this additional control includes a forwardly extending central arm 45 from the head 23 in turn supporting a cam pin 46.

Cooperating with the cam pin 46 is a head lowering cam means in the form of a cam wheel 47 driven by an appropriate motor 48 secured to the front central portion of the table 10 as schematically illustrated in the lower right portion of FIG. 3. Cam wheel 47 includes a flat area 49 and it will be evident that when the head 23 is lowered so that the end of the cam pin 46 engages the cam wheel 47, rotation of this cam wheel 47 to bring the flat portion 49 juxtaposed the end of the pin 46 will result in a gradual further lowering of the head 23.

The above described latter position of the head is illustrated in FIG. 4 wherein it will be noted that the cam pin 46 is engaging the flat portion 49 of the cam wheel 47. This gradual controlled lowering of the head takes place over a short distance designated 50 in FIG. 4 and results in a radial cut in the periphery of the lens 30 indicated at 51 in FIG. 4.

In FIG. 4, a portion of the control means depicted by the block 41 is shown connected to operate the head lowering cam means 47 as indicated by the dashed line 52. Referring once again to FIG. 1, similar controls for the carriage, motor 11, lens motor 36, shaft position 26 and cam motor 20 are indicated by the dashed lines 53, 54, 55 and 56 respectively.

OPERATION

In operation, the head 23 is first raised and opened to a vertical position. The uncut plastic lens 30 is then placed in the chuck 29 and clamped to the shaft 26. The desired lens pattern defining the contour to which the plastic lens is to be cut is placed on the end of the shaft 26 as shown at 35 in FIG. 1. The head is then lowered against the lowering cam 47 and a start button is depressed so that the cutting and edging operation is taken over by the control means in the block 41. This control means results in the head lowering cam 47 described in FIGS. 3 and 4 rotating through 180° to lower the lens 30 into the cutting blade 12 to a depth determined by the point at which the lens pattern 35 engages the larger diameter portion of the lens pattern engaging cam 15. The initial radial cut into the side of the periphery of the plastic lens 30 as already described is shown at 51 in FIG. 4. All this time the carriage 13 holding the cutter motor and cutting blades 12 is locked so that a flat part of the blade engages the lens. The lens drive motor 36 is now started to rotate the lens against the cutting blade. The pattern 35 which determines the contour or shape of the lens is riding on the pattern engaging cam 15.

One revolution of the lens and the pattern is made. During this single revolution, the lens material is actually cut to a rough shape, the removed material being indicated at 30' in FIG. 4. The carriage 13 is now released to "float" and the lens pattern engaging cam 15 is shifted from its initial position illustrated in FIG. 1 to the second position wherein its reduced diameter portion 44 is under the lens pattern 35 resulting in a lowering of the level of the pattern and the lens 30 a given distance, for example, two millemeters. Two more revolutions of the lens are then made, a "V" portion of the blade automatically following the curvature to provide a finishing cut and bevel, these two final revolutions bringing the lens to its final shape and size with the bevel properly positioned. The lifting cam wheel 47 is then operated to lift the head and thus the lens away from the cutting blade 12 and the machine automatically turns itself off.

The most notable features of this machine may be summarized as follows:

1. The floating carriage 13 for the cutter motor and cutting blades causes the blades to float with the curvature of the lens, thus positioning the bevel in the proper place on the lens.

2. The lens pattern engaging cam 15 rotates with the pattern and is moved from a first position causing the lens to be cut, for example, two millimeters oversize in the rough cutting stage to a second position lowering the level of the pattern and lens to cause the lens to be cut and beveled to its final size and shape.

3. The head lowering cam wheel 47 is important in that it lowers the lens into the cutting blade causing the blade to cut into the lens to the proper depth before the lens starts to rotate. This action results in the lens being cut out of the material rather than the material being ground away from the lens.

From all of the foregoing, it will be evident that the present invention has provided a new and different type of cutter and edger particularly designed for acrylic and polycarbonate type plastic lenses.

Obvious modifications of the structure will occur to those skilled in the art. For example, while the lowering of the pattern and lens after the first revolution is effected by shifting the pattern engaging cam longitudinally to position the reduced diameter portion under the pattern, this cam and its mounting yoke could alternatively simply be shifted downwardly between first and second positions by the two millimeters involved to lower the pattern and lens from its first to a second lower level. Such means would be equivalent in function to the horizontal shifting. The plastic lens cutter and edger machine is accordingly not to be thought of as limited to the specific embodiment set forth merely for illustrative purposes.

We claim:

1. A machine for cutting and edging a plastic lens including, in combination:
   (a) a table carrying a lens cutter and lens pattern engaging cam in coaxial alignment;
   (b) a head carrying a plastic lens to be cut and a lens pattern in coaxial alignment;
   (c) means coupling said head to said table for movement towards and away from the axis of said lens cutter and lens pattern engaging cam so that said lens cutter engages the periphery of said lens to be cut;
   (d) a head lowering cam means on said table for receiving said head when said cutter engages the periphery of said lens and gradually lowering said head a given distance to effect a slight radial cut into said periphery, said pattern defining the finished contour of said lens and engaging said cam after said slight radial cut is made into said periphery; and
   (e) means for effecting a rotation of said lens and pattern simultaneously, resulting in a cutting of said lens out of the lens material by said lens cutter as opposed to grinding away the periphery of said lens.

2. A machine according to claim 1, including means mounting said lens cutter to said table for free longitudinal movement so that said cutter can automatically follow the curvature of said lens during additional rotations to provide a finishing cut and bevel.

3. A machine according to claim 2, including means for moving said lens pattern engaging cam between first and second positions to effect a lowering of the lens pattern and lens after completion of said first mentioned rotation for providing said finishing cut and bevel.

4. A machine for cutting and edging plastic lens including, in combination:
   (a) a table;
   (b) a lens cutter;
   (c) means mounting said lens cutter to said table for horizontal movement;
   (d) a lens pattern engaging cam;
   (e) means mounting said lens pattern engaging cam to said table for rotation about an axis coaxial with said lens cutter and for movement between first and second positions relative to said table for positioning said lens pattern and lens at a first level when in said first position and at a reduced second level when in said second position;
   (f) a head;
   (g) means coupling said head to said table for movement towards and away from the axis of said lens cutter;
   (h) a shaft carried on said head including a lens holder for supporting a plastic lens to be cut;
   (i) a lens pattern holder on said shaft coaxial with said lens holder for holding a lens pattern in position to be engaged by said lens pattern engaging cam; and
   (j) means for holding said lens cutter in a fixed horizontal position and releasing said lens cutter for free horizontal floating movement, whereby a plastic lens to be cut can be secured in said lens holder, a lens pattern defining the cutting contour of said lens secured in said lens pattern holder on said shaft and said head moved towards said axis of said lens cutter until said lens pattern is engaged by said lens pattern engaging cam thereby resulting in said cutter cutting into the side of said lens, one rotation of said shaft carrying said lens and pattern, causing said cutter to rough cut said lens in accord with said pattern, and thereafter releasing said cutter for free floating movement and shifting of said lens pattern engaging cam from said first to second position resulting in a lowering of the lens pattern and cutter during two subsequent rotations of said shaft thereby providing a finishing cut and beveling of said lens.

5. A machine according to claim 4, including a head lowering cam means on said table for receiving said head when initially moved towards said axis and gradually lowering said head a given distance for controlling the cutting into the side of said lens.

6. A machine according to claim 5, including a cutter motor for operating said lens cutter; a lens motor for rotating said shaft carrying said lens holder and lens pattern holder; a cam moving motor for moving said lens pattern engaging cam between said first and second positions; and control means connected to said head lowering cam means, cutter motor, lens motor, shaft supporting said lens holder and lens pattern holder, and cam motor for automatically operating the same in proper sequence.

* * * * *